United States Patent [19]
Lu et al.

[11] Patent Number: 5,812,199
[45] Date of Patent: Sep. 22, 1998

[54] SYSTEM AND METHOD FOR ESTIMATING BLOCK MOTION IN A VIDEO IMAGE SEQUENCE

[75] Inventors: Jian Lu, Santa Clara; Ke-Chiang Chu, Saratoga; Yu Tina Tian, Stanford; Hsi-Jung Wu, Mountain View, all of Calif.

[73] Assignee: Apple Computer, Inc., Cupertino, Calif.

[21] Appl. No.: 678,102

[22] Filed: Jul. 11, 1996

[51] Int. Cl.$^6$ ........................................... H04N 7/36
[52] U.S. Cl. ............................. 348/416; 348/699
[58] Field of Search ..................... 348/699, 402, 348/409, 412, 413, 415, 416, 420; 382/236, 238

[56] References Cited

PUBLICATIONS

Bede Liu and Andr´´Zaccarin, "New Fast Algorithms for the Estimation of Block Motion Vectors," IEEE Transactions On Circuits And Systems For Video Technology, vol. 3, No. 2, Apr. 1993, pp. 148–157.
A. Murat Tekalp, "Block–Based Methods," Digital Video Processing, 1995, pp. 95–116.
International Telecommunication Union, "Line Transmission of Non–Telephone Signals—Video Coding For Low Bitrate Communication," Draft H.263, Dec. 5, 1995, pp.1–52.

*Primary Examiner*—Amelia Au
*Attorney, Agent, or Firm*—Carr & Ferrell LLP

[57] ABSTRACT

A system for estimating block motion from a previous frame to a current frame, wherein motion vectors have been computed for blocks in the previous frame. The system comprises a P-checkerboard processor, an S-checkerboard processor and a block matching engine. The a P-checkerboard processor selects a first current block from a primary checkerboard pattern, retrieves motion vectors for reference blocks in the previous frame, and uses the retrieved motion vectors to generate a temporal search window. The block matching engine locates in the temporal search window a block which best matches the first current block, and determines the current motion vector from the best matching block to the first current block. Alternatively, the a P-checkerboard processor can use the retrieved motion vectors to interpolate the current motion vector. The S-checkerboard processor selects a second current block from a secondary checkerboard pattern, and uses the current motion vector to generate a spatial dynamic search window. The block matching processor locates in the spatial search window the block which best matches the second current block, and determines the current motion vector from the best matching block to the second current block.

31 Claims, 14 Drawing Sheets

Current Frame

Previous Frame

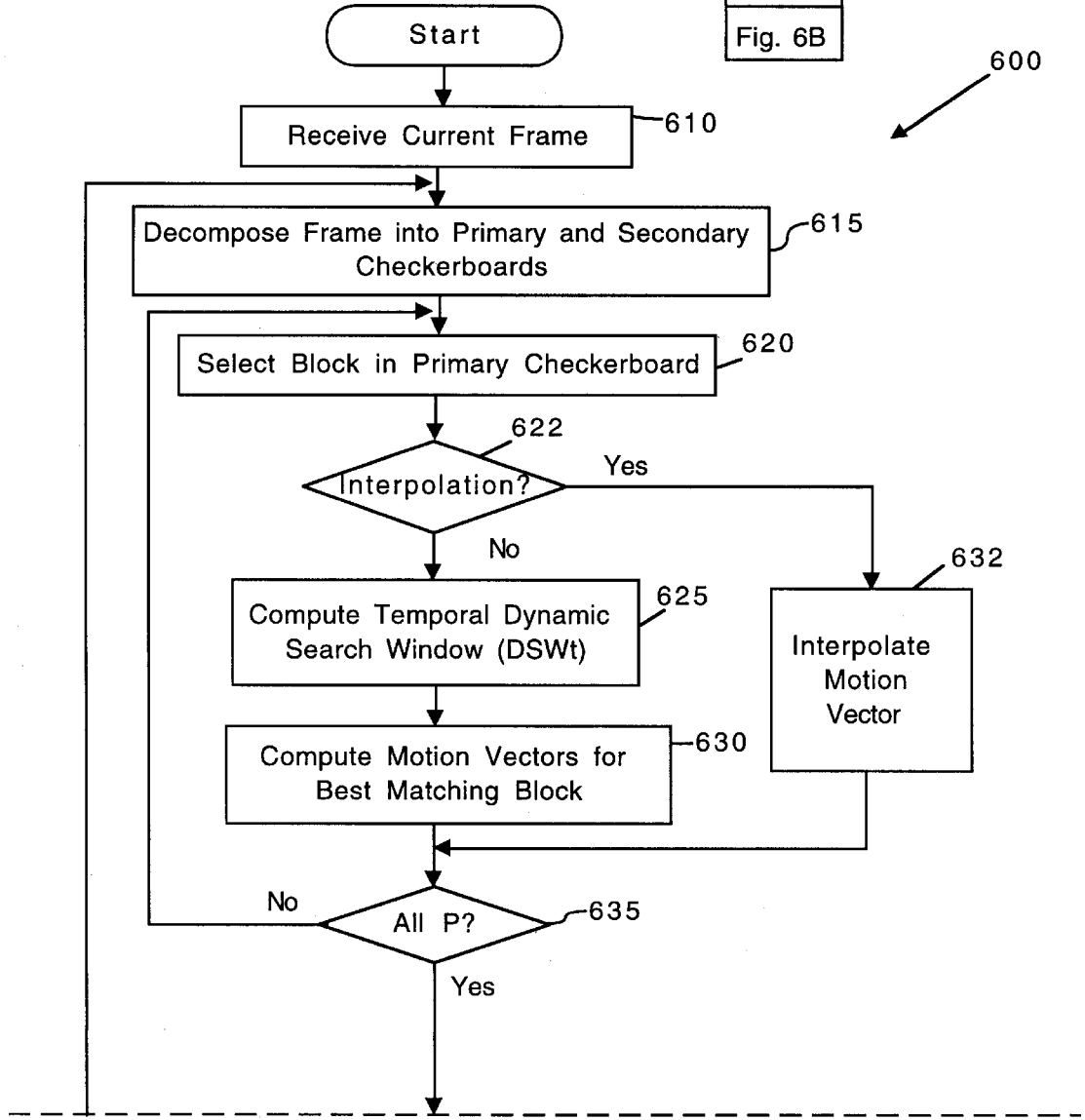

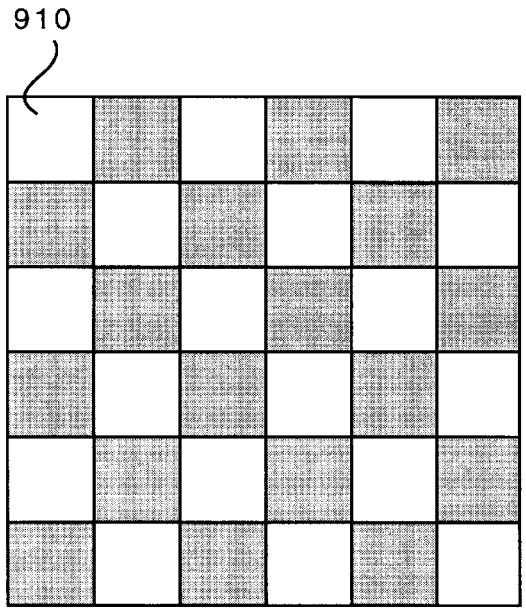
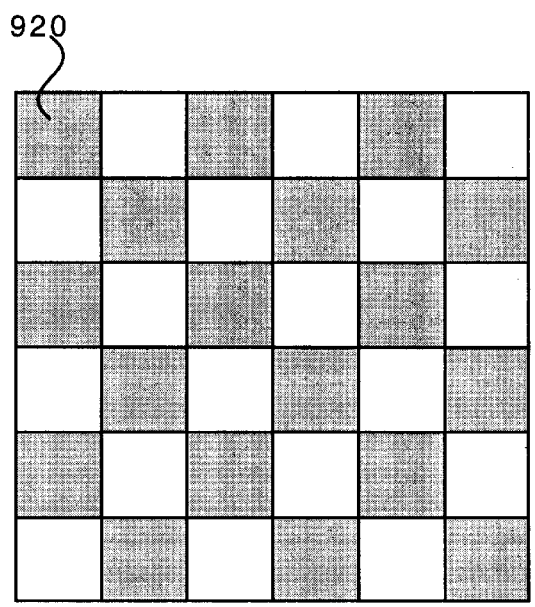
Pattern I    Pattern J
FIG. 9

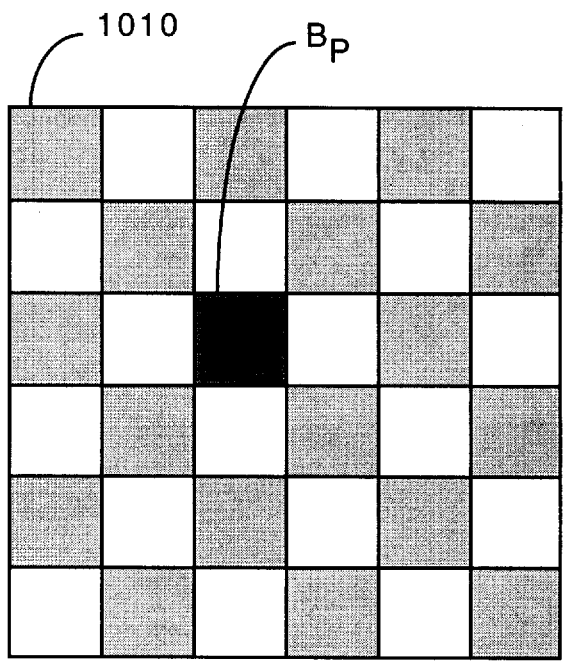
Current Frame: P Checkerboard
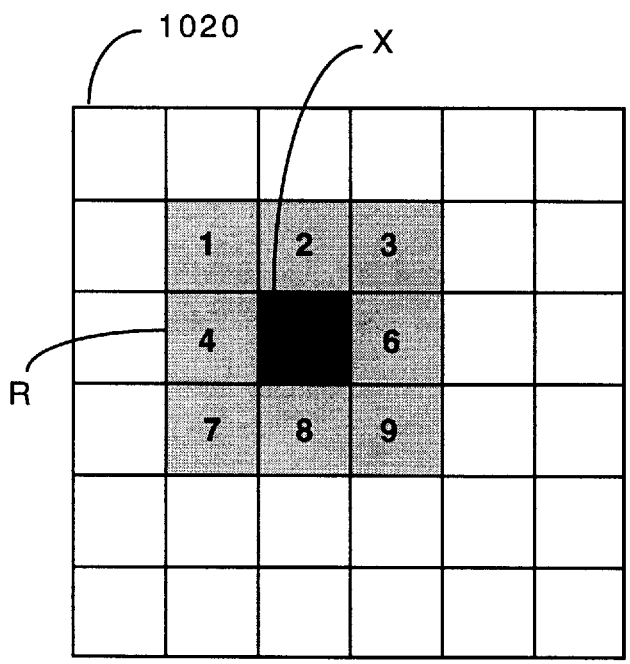
Previous Frame
FIG. 10

Current Frame: S Checkerboard

SYSTEM AND METHOD FOR ESTIMATING BLOCK MOTION IN A VIDEO IMAGE SEQUENCE

BACKGROUND OF THE INVENTION

1. Field of the Invention

This invention relates generally to video image coding and compression, and more particularly to a system and method for estimating block motion in a video image sequence to reduce interframe redundancy, and thus transmission and storage costs.

2. Description of the Background Art

Digital video provides crisper pictures and is more easily manipulated than analog video, and therefore is becoming widespread in today's video market. However, enormous amounts of memory and communication channel capacity are needed to store digital video, which is especially troublesome when transmitting digital video through a network medium such as the Internet. System designers are thus investigating various techniques for compressing digital video.

A good image sequence compression technique relies on motion estimation, which predicts the movement of objects between frames. As a substitute for storing an image frame, motion estimation enables storage of motion vectors representing object movement relative to the previous frame, thus avoiding the storage of redundant information.

A popular motion estimation technique is block-based. FIG. 1 is a flowchart illustrating a prior art block motion estimation method 100, which begins in step 110 by retrieving a current frame and continues in step 120 by dividing the current frame into blocks of equal size, typically set by a video coding standard. An example divided current frame 210 is shown in FIG. 2. Each block in the current frame is referred to as a "current block." Method 100 continues in step 130 by retrieving the previous frame. An example previous frame 220 is also shown in FIG. 2. Each block in the previous frame is referred to as a "previous block." In step 140, each current block is sequentially selected and compared with previous blocks until the location of the previous block that best matches the current block is determined.

To determine the best matching previous block, the block motion estimation model assumes that all pixels in a previous block move equally and in the same direction and accordingly computes an error E with $$E = \sum_{(x,y) \in B} |P_{current}(x,y) - P_{previous}(x+dx, y+dy)| \quad (1)$$

where $P_{current}(x,y)$ is a pixel at point (x,y) in the current block such as in block B in frame 210, $P_{previous}(x+dx,y+dy)$ is a pixel at point (x+dx, y+dy) in the previous block such as in block Y, and (dx,dy) is the motion vector or displacement from the previous block X having the same location as the selected current block B. By varying (dx,dy), the errors E corresponding to different previous blocks are computed. A search window W represents the maximum variation in (dx,dy), which is typically a predetermined size, set by the system designers or international standards, to be examined. The block in the search window W having the minimum error E is determined to be the best matching previous block. When the best matching block is located, the motion vector (dx,dy) between the current block and the best matching block determined in step 150 is retrieved.

Several international compression standards employing block motion estimation have been adopted, including MPEG-1, MPEG-2, ITU H.261 and ITU H.263. For example, MPEG-1 sets a standard of compressing video bitstreams into a bandwidth of 1.5 megabits per second, which is the rate of audio compact disks and digital audio tapes. So long as an encoded video bitstream meets the selected international standard, designers may use any motion estimation algorithm.

Block motion estimation methods are conceptually simple but computationally expensive. The brute force implementation of block matching examines every location in the search window W to look for the besting matching block. This is often referred to as a "full search." The full search gives the best estimation of the motion vector, but is also the most expensive. Other search strategies such as the "log-D search" and "cross-search" have been proposed for reducing the amount of computation. Both "log-D search" and "cross-search" are described in detail in a book, *Digital Video Processing*, by A. Murat Tekalp, Prentice Hall PTR, 1995. Combined with a smart search strategy such as the "log-D search," several techniques have been developed to further reduce the computational requirement of block motion estimation.

A first technique is early termination of the error computation. As the error E is being summed based on a particular previous block, the error E is compared with the current minimum of E. If the partial sum of E for a block is found to be greater than the current minimum of E, then there is no need to continue the process and the computation is terminated early.

A second technique for reducing block motion estimation computation is quick identification of the zero motion vector, since image frames often contain stationary background. The error E is computed first for the previous block X (FIG. 2), which is at the same location as the current block B. If the error E is lower than a predetermined threshold T, the block X and thus the zero motion vector are selected without testing other blocks.

A third technique for reducing block motion estimation computation is block subsampling in error computation. The error E is computed for a current block subsample, which can be selected from a fixed or random position in the block or can be an average of selected pixels. In a typical factor-4 subsampling, the error E is determined using one out of every four pixels in a block.

A fourth prior art technique for reducing block motion estimation computation is spatial interpolation of motion vectors. Motion vectors for a selected number of blocks are first computed, and the motion vectors for the neighboring blocks are interpolated from these motion vectors. For example, motion vectors may be determined for the even blocks, and an estimate made to determine the motion vectors of the odd blocks by interpolating from the motion vectors of the neighboring even blocks.

Unfortunately, block motion estimation is still computationally expensive. Therefore, a system and method are needed for further reducing block motion estimation computation requirements.

SUMMARY OF THE INVENTION

The present invention provides an improved system and method for reducing block motion estimation computation requirements. The system includes a central processing unit (CPU) that connects with a memory, which stores a video coding system program comprising a motion estimator. The motion estimator includes a P-checkerboard processor, an S-checkerboard processor and a block matching engine capable of performing an initial-conditioned search.

The P-checkerboard processor selects a block from the P-checkerboard of a current frame, and retrieves the motion vectors which have been previously determined for a set of reference blocks in the previous frame. Based on the reference motion vectors, the P-checkerboard processor computes a temporal dynamic search window in the previous frame in which to perform block matching. The length of each side of the window is equal to two times the largest retrieved reference motion vector, with the center at the same location as the center of the selected current block. Using a conventional error function, the block matching engine locates the best matching previous block, and accordingly determines the motion vector from the best matching block to the selected current block. The block matching engine has the capability of performing an initial-conditioned search for determining a preferred location at which to begin block matching and for terminating when a predefined bound for error E is met. The P-checkerboard processor and the block matching engine repeat the above process for all the blocks of the P-checkerboard. Alternatively, the P-checkerboard processor can interpolate the current motion vectors from the retrieved motion vectors and bypass the steps of computing a temporal dynamic search window and of block matching.

The S-checkerboard processor selects a block from the S-checkerboard of the current frame, and retrieves the motion vectors for the neighboring blocks previously computed by the P-checkerboard processor. Based on these motion vectors, the S-checkerboard processor generates a spatial dynamic search window in the previous frame in which to perform block matching. The block matching engine uses the conventional error function to locate the best matching block and accordingly to determine the motion vector from the best matching block to the selected current block. The S-checkerboard processor and the block matching engine repeat this process for all the blocks of the S-checkerboard.

The method for reducing the computation requirements of block matching includes the steps of selecting a block from the P-checkerboard or the S-checkerboard, locating reference blocks, retrieving motion vectors for the reference blocks, computing a temporal dynamic search window based on these motion vectors, locating the best matching previous block via the initial conditioned search in the temporal window and determining the motion vector from the best matching block to the selected current block. As an alternative to the steps of computing, locating and determining, the step of interpolating a motion vector for the current block from the known motion vectors for the reference blocks may be performed.

BRIEF DESCRIPTION OF THE DRAWINGS

FIGS. 6A and 6B are a flowchart illustrating a method for estimating block motion, in accordance with the present invention;

FIG. 9 is a block diagram illustrating example primary and secondary checkerboard patterns;

FIG. 10 is a block diagram illustrating an example current frame and previous frame for determining the temporal dynamic search window;

DETAILED DESCRIPTION OF THE PREFERRED EMBODIMENT

Figure 1:
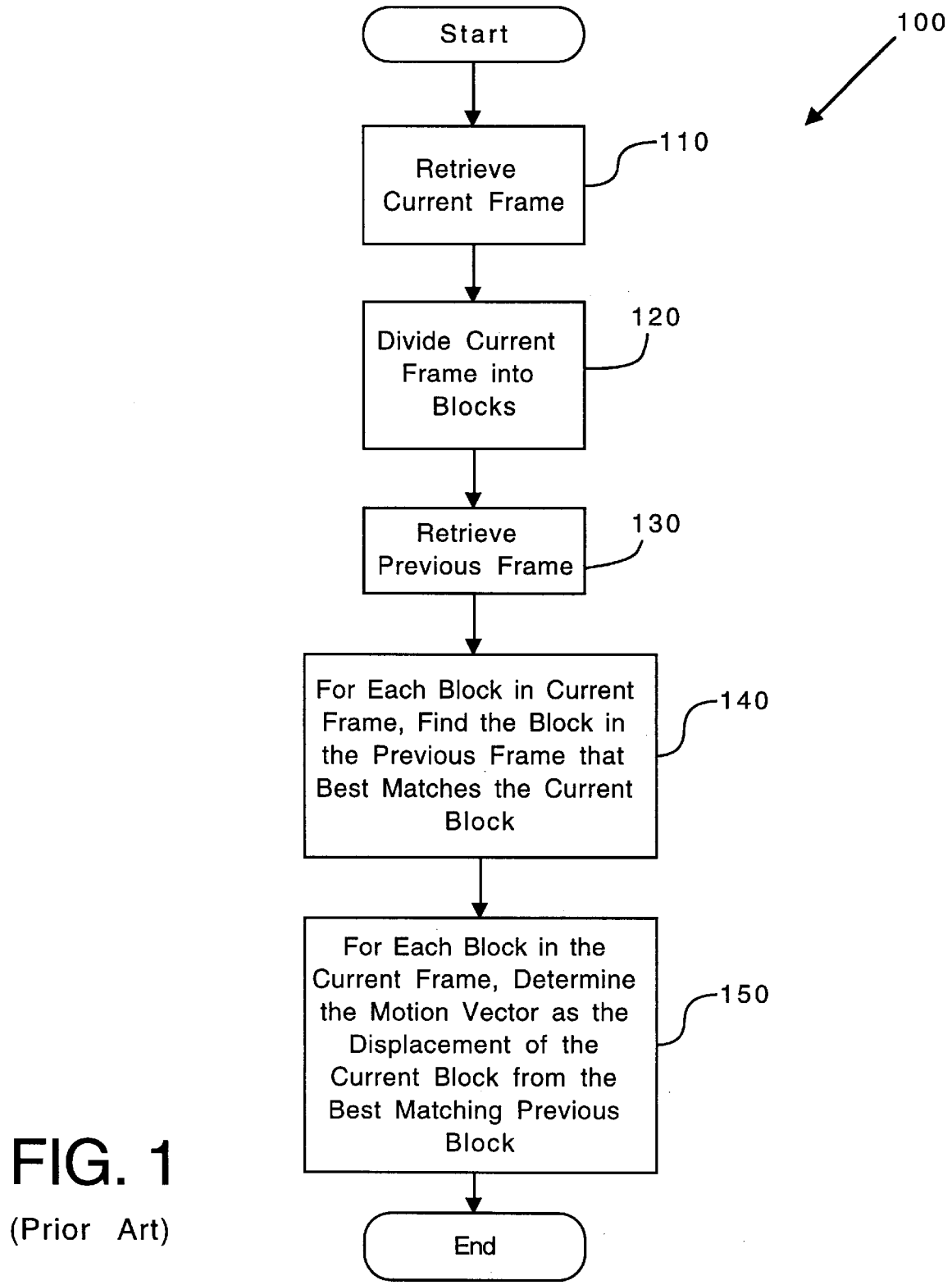
FIG. 1 is a flowchart illustrating a prior art method of block motion estimation.
Figure 2:
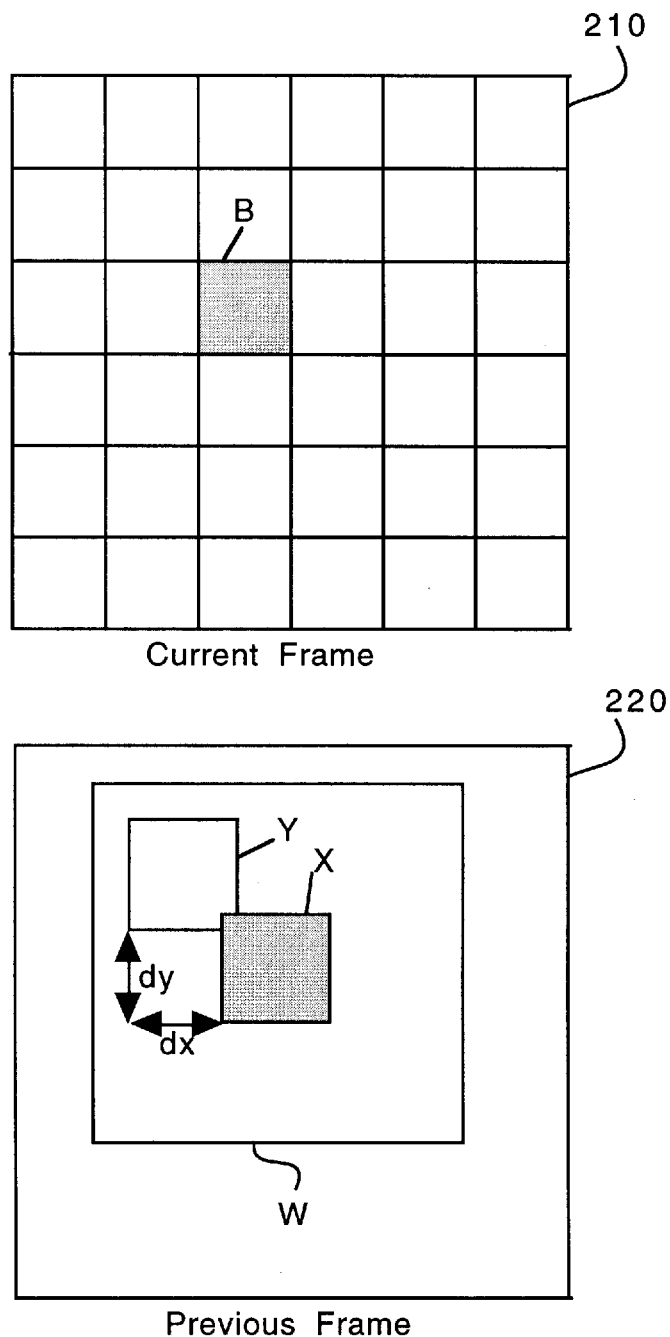
FIG. 2 is a block diagram illustrating a prior art example of block motion estimation.
Figure 3:
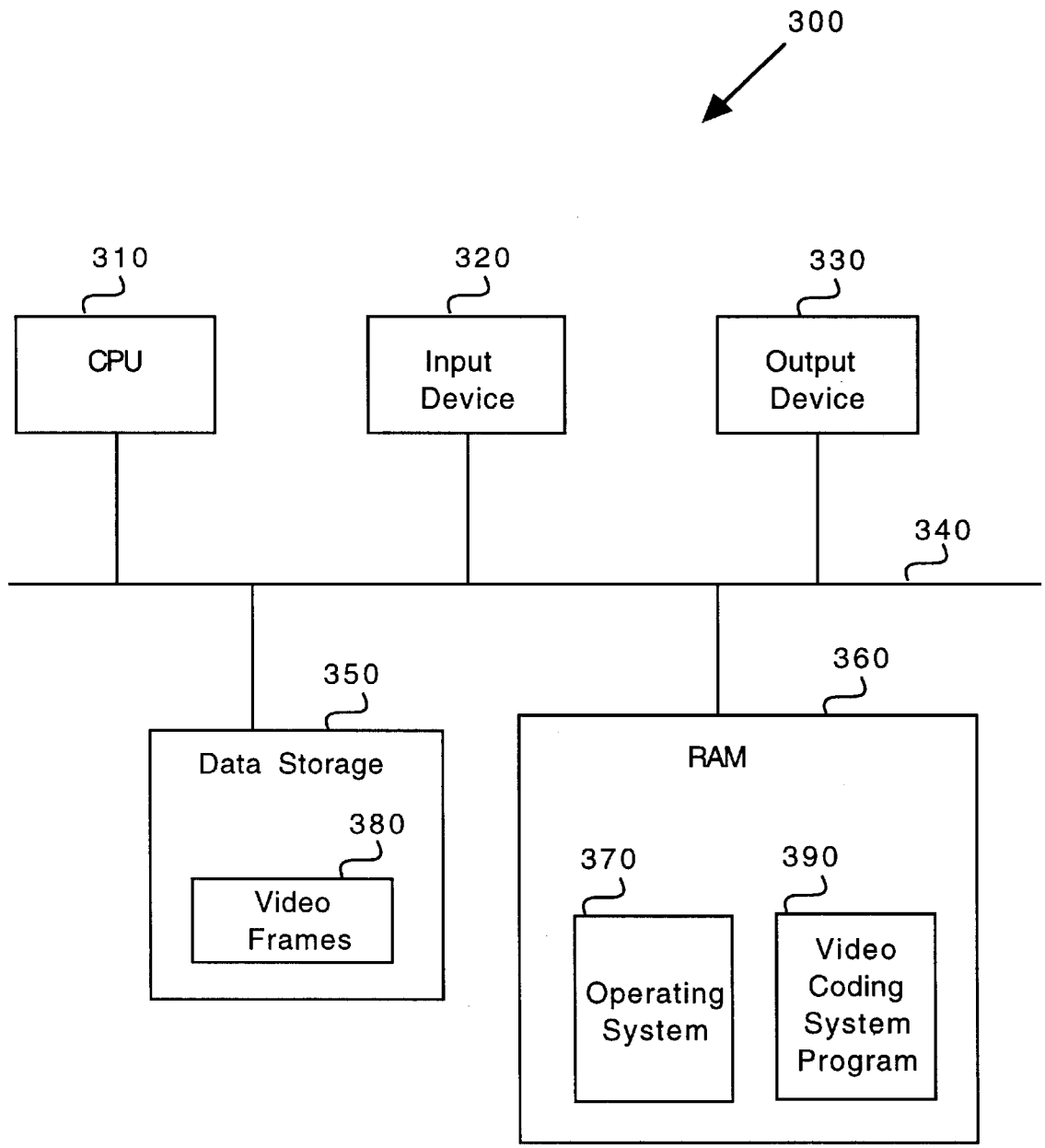
FIG. 3 is a block diagram illustrating a computer system for encoding video sequences, in accordance with the present invention.

FIG. 3 is a block diagram illustrating a video coding system 300, including a CPU 310 based on a computer such as preferably a Power Macintosh manufactured by Apple Computer, Inc. of Cupertino, Calif. An input device 320 such as a keyboard and mouse, scanner, video camera or laser disk, and an output device 330 such as a Cathode Ray Tube (CRT) display are coupled via a signal bus 340 to CPU 310. A data storage 350, including Read Only Memory (ROM) and a hard disk, and a Random Access Memory (RAM) 360 are also coupled via signal bus 340 to CPU 310.

An operating system 370 is a program that controls processing by CPU 310, and is typically stored in data storage 350 and loaded into RAM 360 for execution. Video frames 380 may be loaded via input device 320 to data storage 350. A video coding system 390 is preferably a program for compressing video image sequences 380, and may also be stored in data storage 350 and loaded into RAM 360 for execution. Alternatively, video coding system 390 may be embodied in hardware circuits, such as in a chip or board, and used independently or with a general purpose computer.

Figure 4:
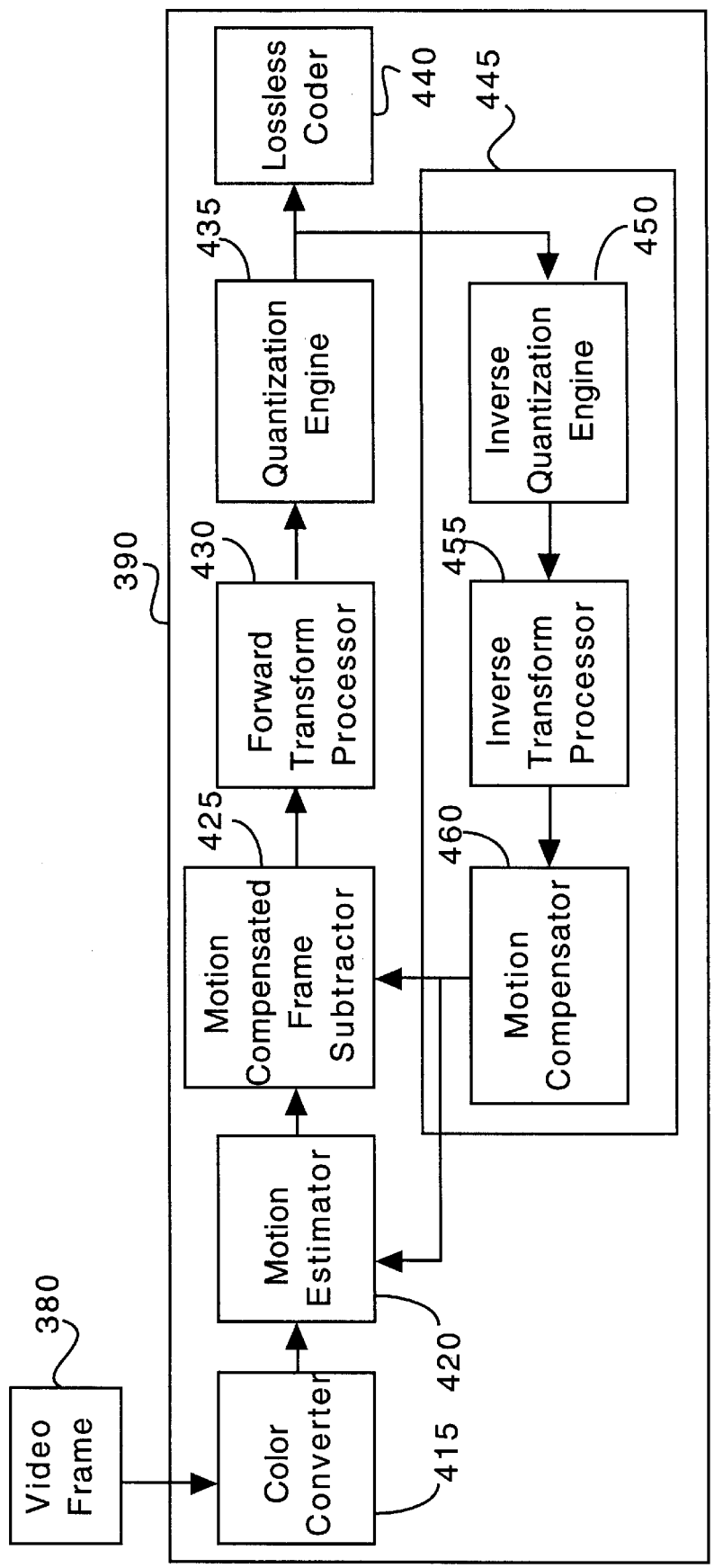
FIG. 4 is a block diagram illustrating the FIG. 3 video coding system program.

FIG. 4 is a block diagram illustrating video coding system 390, which comprises program routines including a color converter 415, a motion estimator 420, a motion compensated frame subtractor 425, a forward transform processor 430, a quantization engine 435, a lossless coder 440 and a feedback path 445. Feedback path 445 includes an inverse quantization engine 450, an inverse transform processor 455 and a motion compensator 460.

Color converter 415 conventionally receives and converts a current video frame 380 from Red/Green/Blue (RGB) format to a luminance/chrominance format such as YUV. Color converter 415 sends converted video frame 380 to motion estimator 420, which compares converted video frame 380 with the previous, or initial, frame received from feedback path 445 to estimate the motion vector. Feedback path 445 is described in greater detail below.

Motion estimator 420 sends current frame 380 and the estimated motion vector to motion compensated frame subtractor 425, which subtracts the previous frame from the current frame 380 to determine the residual error. Subtractor 425 sends the residual information to forward transform processor 430, which transforms the residual information, for example, by applying a conventional Discrete Cosine Transform (DCT). Discrete Cosine Transforms convert information from the spatial domain to the frequency domain, to achieve a more compact representation.

Processor 430 sends the DCT coefficients to quantization engine 435, which approximates the information by dividing all coefficients by a constant, for example, 32. This approximation results in substantial compression, but with information loss. Quantization engine 435 sends the approximated coefficients to lossless coder 440 and to the feedback loop 445. Lossless coder 440 can for example store the information to data storage 350, transmit the information to output device 330, or transmit the information through a network (not shown) to another system (not shown) for video output.

Feedback loop 445 receives and decompresses the approximated information from quantization engine 435. The decompressed information is accordingly used as the previous frame for block matching with the next current frame 380. More specifically, inverse quantization engine 450 receives the approximated information, and multiplies all coefficients by the predetermined constant. Inverse transform processor 455 uses the Inverse Discrete Cosine Transform (IDCT) to convert the information back to the spatial domain. Motion compensator 460 uses the motion vectors to calculate a prediction, adds the residual to the prediction to generate a reconstructed frame, and transfers the reconstructed frame to motion estimator 420 for motion estimation of the next frame.

Figure 5:
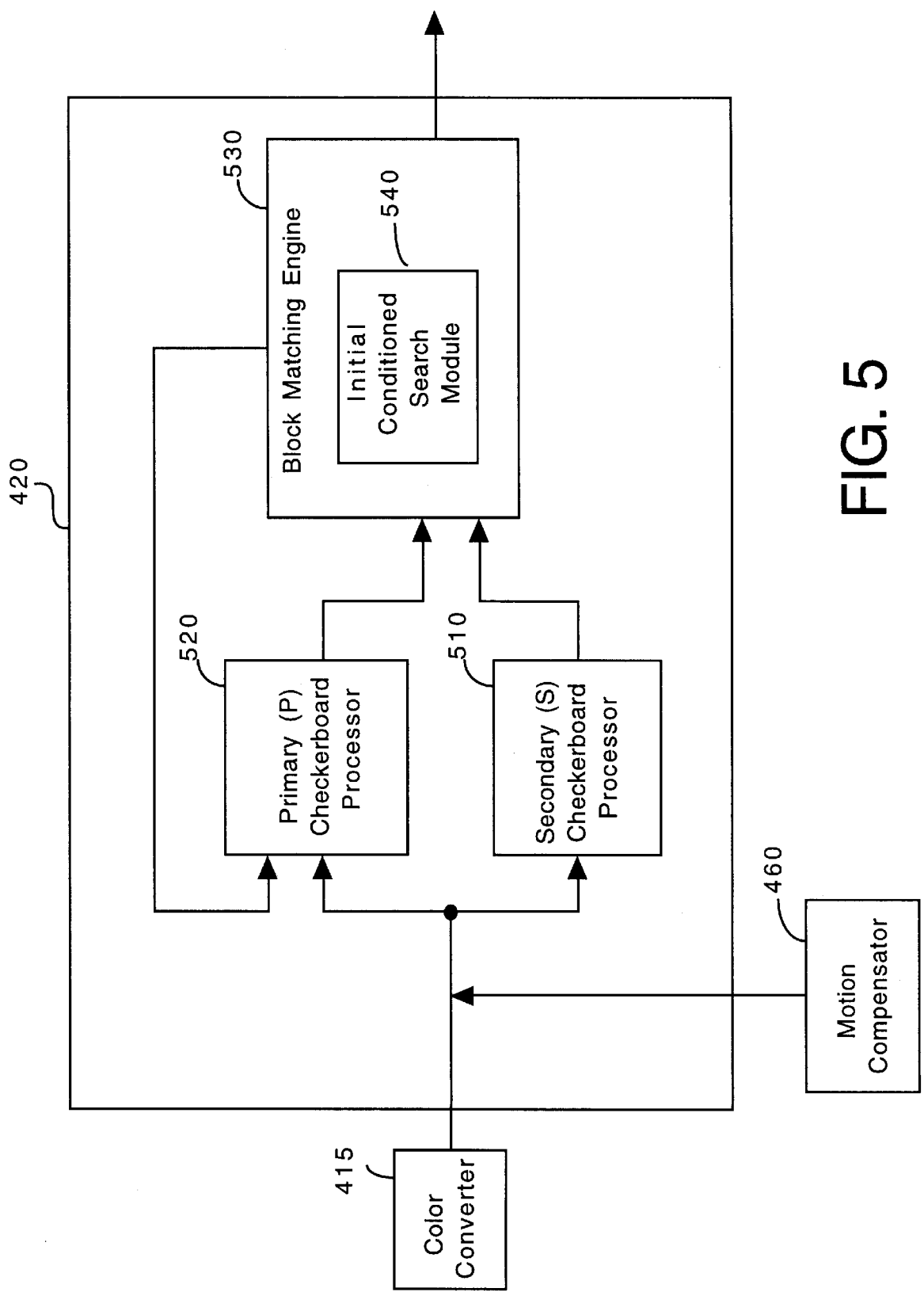
FIG. 5 is a block diagram illustrating the FIG. 4 motion estimator.

FIG. 5 is a block diagram illustrating the details of motion estimator 420, which includes a P-checkerboard processor 510, an S-checkerboard processor 520 and a block matching engine 530 containing an initial-conditioned search module 540. P-checkerboard processor 510 examines only a primary (P) checkerboard portion of current video frame 380 received from color converter 415. FIG. 9 illustrates two example checkerboard patterns, namely, Pattern I and Pattern J. Pattern I is a six-by-six checkerboard pattern where the top left block 910 starts as "off." Pattern J is a six-by-six complementary checkerboard pattern where the top left block 920 starts as "on." The P-checkerboard pattern can be either pattern I or pattern J, and preferably alternates between the checkerboard patterns with sequential frames. Although the example patterns are illustrated as six-by-six checkerboards, any size checkerboards can alternatively be used.

Processor 510 selects a P-checkerboard block from the current frame 380 for comparison against the previous frame received from motion compensator 460. FIG. 10 illustrates an example P-checkerboard current frame 1010, an example selected current block $B_P$ and an example previous frame 1020 for comparison against current frame 1010. Processor 510 locates previous block X, having the same location as current block $B_P$, and its eight neighboring blocks. These nine blocks are labeled 1–9 and are referred to as reference (R) blocks.

Processor 510 retrieves the motion vectors for the reference blocks, previously determined with reference to the frame before the previous frame, as described in greater detail with reference to FIG. 7. Processor 510 defines the length of each side of a temporal dynamic search window (DSWt) to be equal to two times the maximum motion vector of any of the reference blocks, or DSWt=2*max (|dx|, |dy|, DSWt), where DSWt is initially set to zero. As stated above, the window defines the area in the previous block for performing block matching. An INTRA block is an image block coded directly without motion estimation, and is typically used when motion estimation and compensation do not work effectively, e.g. when the best matching block has large residual error E. If one of the reference R blocks is an INTRA block, then processor 510 defines the window equal to the standard search window W.

Processor 510 forwards the search window information to block matching engine 530, which searches for the best matching previous block by performing block matching in the search window, and determines the motion vector from the best matching block to the current block. Block matching engine 530 has a built-in module 540 for initial-conditioned searches, as described in greater detail with reference to FIG. 12. Processor 510 repeats the current block selection and temporal search window computation, and block matching engine 530 repeats the current motion vector determination, for each block in the P-checkerboard.

Alternatively, processor 510 may choose to generate current motion vectors by interpolating from the previous motion vectors for the reference blocks. The motion vector interpolator is described in greater detail with reference to FIG. 13. Although interpolating current motion vectors compromises accuracy of motion estimation, it advantageously avoids computing a temporal dynamic search window and block matching, and therefore reduces computation time.

Figure 11:
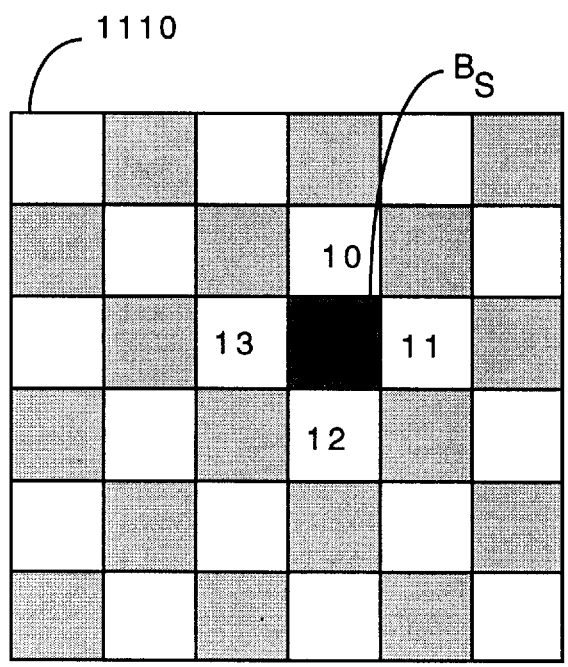
FIG. 11 is a block diagram illustrating an example current frame for determining the spatial dynamic search window.

S-checkerboard processor 520 selects a current block from the S-checkerboard, and gathers the motion vectors of neighboring blocks that have already been computed by matching engine 530 in conjunction with P-checkerboard processor 510. FIG. 11 illustrates an example S-checkerboard 1110, an example selected current block $B_S$ and the location of the neighboring blocks for which motion vectors have been computed by processor 510 and matching engine 530, designated as blocks 10–13. In this example, the relevant four neighboring blocks include the block directly above, the block directly below, the block directly to the left and the block directly to the right of the selected block $B_S$.

Using the motion vectors already computed for blocks 10–13, processor 520 generates a spatial dynamic search window (DSWs), wherein the length of each side is equal to two times the maximum motion vector, or DSWs=2*max (|dx|, |dy|, DSWs), where DSWs is initially set to zero. Again, if one of the reference blocks R is an INTRA block, then the standard search window W is used. Processor 520 forwards the search window information to block matching engine 530, which uses an initial-conditioned search module 540 to compute the best matching previous block within the computed spatial search window. Block matching engine 530 then determines the motion vector as the displacement from the best matching previous block to the current block. Processor 520 repeats the block selection and spatial search window computation, and block matching engine 530 repeats the current motion vector determination, for each block in the S-checkerboard.

Similarly to processor 510, processor 520 may generate current motion vectors by spatially interpolating from motion vectors already obtained for neighboring current blocks. Although interpolating current motion vectors compromises accuracy of motion estimation, spatially interpolating current motion vectors advantageously avoids computing a spatial dynamic search window and avoids block matching, and therefore reduces computation time.

Figure 6B:
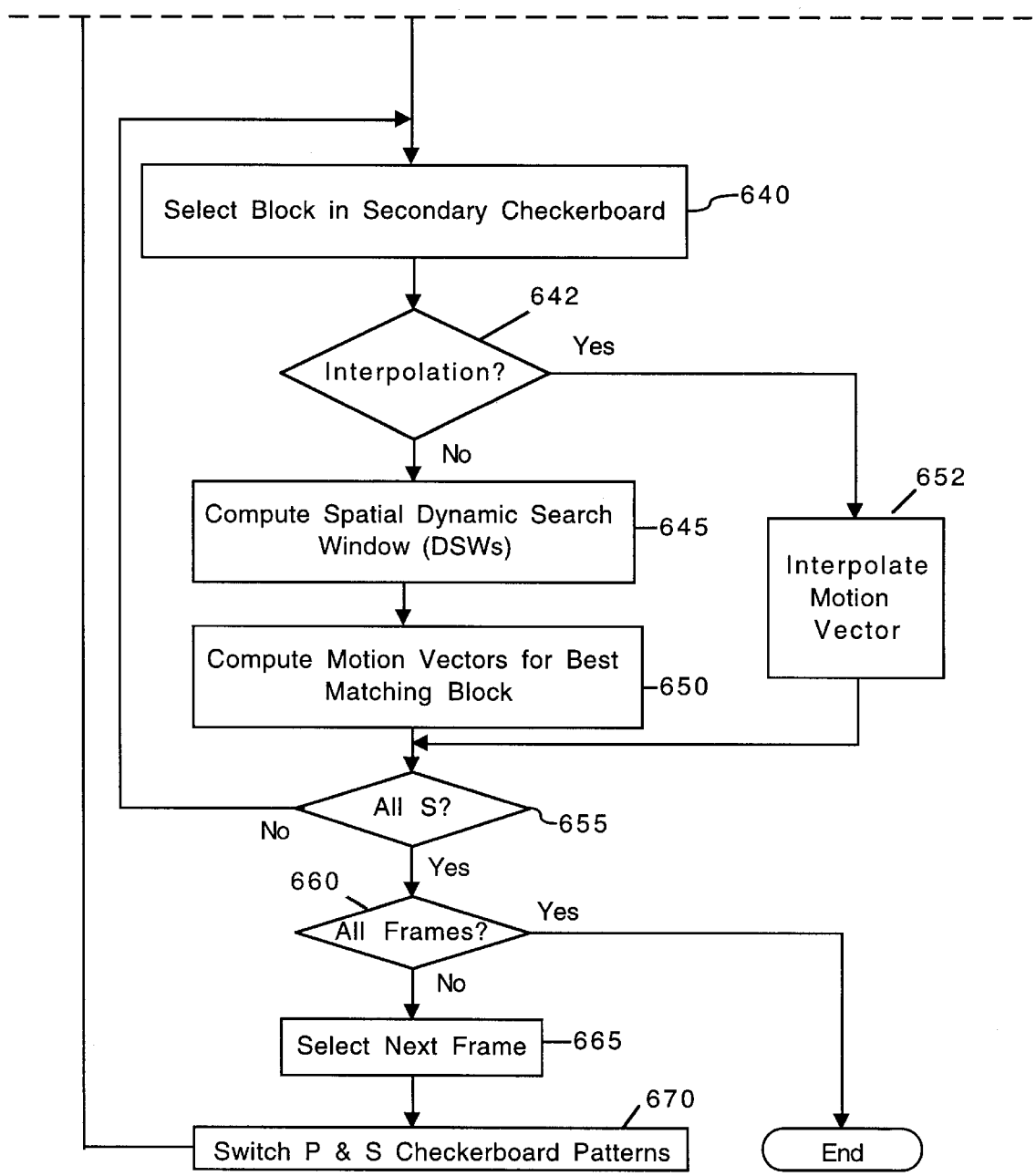

FIGS. 6a and 6b are a flowchart illustrating a method 600 for estimating block motion. Method 600 begins in step 610 by receiving the current frame 380. In step 615 the current frame 380 is decomposed into primary (P) and secondary (S)

checkerboards. P-checkerboard processor 510 in step 620 selects a block from the P-checkerboard, and in step 622 chooses one out of two alternative modes in which to operate. The choice of mode is signaled by external means, e.g., by user specification. If in step 622, interpolation is not selected, then the P-checkerboard processor 510 in step 625 computes a temporal dynamic search window (DSWt), which is described in greater detail with reference to FIG. 7. Block matching engine 530 in step 630 receives the temporal dynamic search window (DSWt) information from processor 510, uses initial-conditioned search module 540 and the error function E defined by Eq. (1) to locate the best matching block, and determines the motion vector between the selected block and the best matching block. If in step 622, interpolation is selected, then the P-checkerboard processor 510 in step 632 interpolates the motion vector for the current block from the motion vectors already computed for the reference blocks. Step 632 is described in greater detail with reference to FIG. 10 and FIG. 13. It should be noted that the interpolation mode of step 632 cannot be chosen if all reference blocks of the current block are INTRA blocks. INTRA block and reference blocks are described in greater detail with reference to FIGS. 7–11. As illustrated in step 635, processor 510 repeats steps 620–635 for all blocks in the P-checkerboard.

S-checkerboard processor 520 in step 640 selects a block from the S-checkerboard, and in step 642 chooses one out of two alternative modes to operate as signaled by external means such as by user specification. If in step 642, interpolation is not selected, then the S-checkerboard processor 520 in step 645 computes a spatial dynamic search window (DSWs) for the selected block. Step 645 is described in greater detail with reference to FIG. 8. Block matching engine 530 in step 650 receives the spatial dynamic search window (DSWs) information from processor 520, uses initial-conditioned search module 540 and the error function E defined by Eq. (1) to locate the best matching block, and determines the motion vector between the selected block and the best matching block. If in step 642, interpolation is selected, then the S-checkerboard processor 520 in step 652 interpolates the motion vector for the current block from the motion vectors already computed for its neighboring blocks. Step 652 is described in greater detail with reference to FIG. 13 and FIG. 11. It should be noted that the interpolation mode cannot be chosen if all reference blocks of the current block are INTRA blocks. As illustrated in step 655, processor 520 repeats steps 640–655 for all blocks in the S-checkerboard.

As illustrated in step 660, when all frames have been examined, method 600 ends. Otherwise, in step 665 the next frame is selected, and in step 670 the patterns for the P and S-checkerboards are switched to avoid degradation and thus to achieve a more accurate motion vector estimation. Method 600 then returns to step 615.

Figure 7:
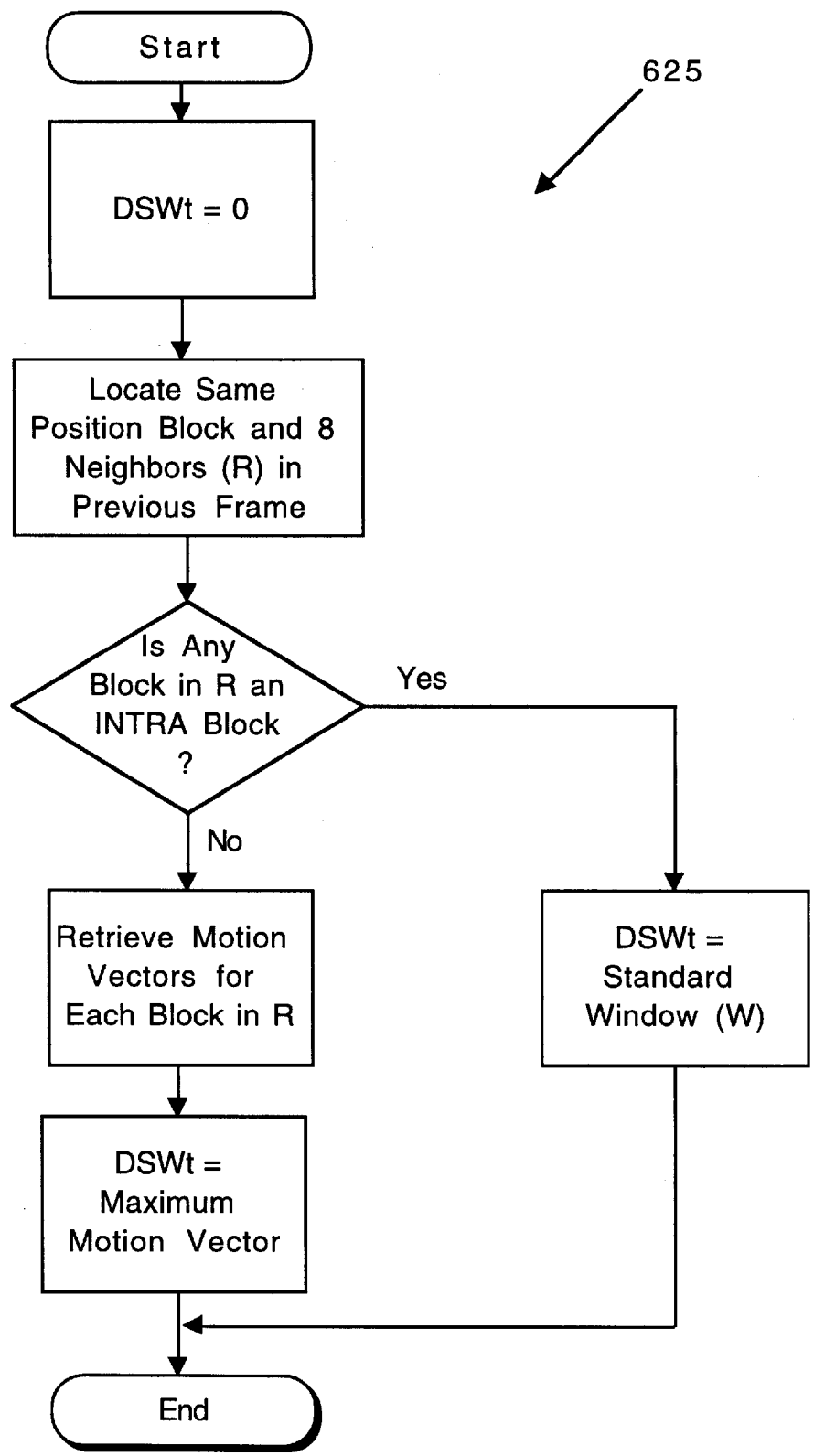
FIG. 7 is a flowchart further illustrating the step of FIGS. 6a and 6b of computing a temporal dynamic search window.

FIG. 7 is a flowchart illustrating the details of step 625 for computing a temporal dynamic search window for a selected block in the P-checkerboard of a current frame, such as block B$_P$ of frame 1010 (FIG. 10). Step 625 begins in step 710 by P-checkerboard processor 510 setting DSWt equal to zero. Processor 510 in step 720 receives the previous frame, such as frame 1020 (FIG. 10), from motion compensator 460, and locates reference R blocks, namely, the same position block X and its eight neighbors, illustrated as blocks 1–9 in frame 1020.

Processor 510 in step 730 determines if any block in R is an INTRA block. If so, then processor 510 in step 760 defines DSWt to be equal to the conventional window W, typically sized by the chosen coding standard. Otherwise, processor 510 in step 740 retrieves the motion vectors previously generated for the reference R blocks. It will be appreciated that the first frame in a frame sequence is always specified by INTRA blocks. Since the first frame contains only INTRA blocks, processor 510 locates the best matching blocks for the second frame based on the conventional window W, and accordingly computes the motion vectors. Accordingly, processor 510 can use reference blocks from the second frame for determining the window size for the third frame. Processor 510 in step 750 defines the length of each side of the DSWt to be equal to two times the maximum motion vector, such that the location of the center of the selected block is the center of the window.

Figure 8:
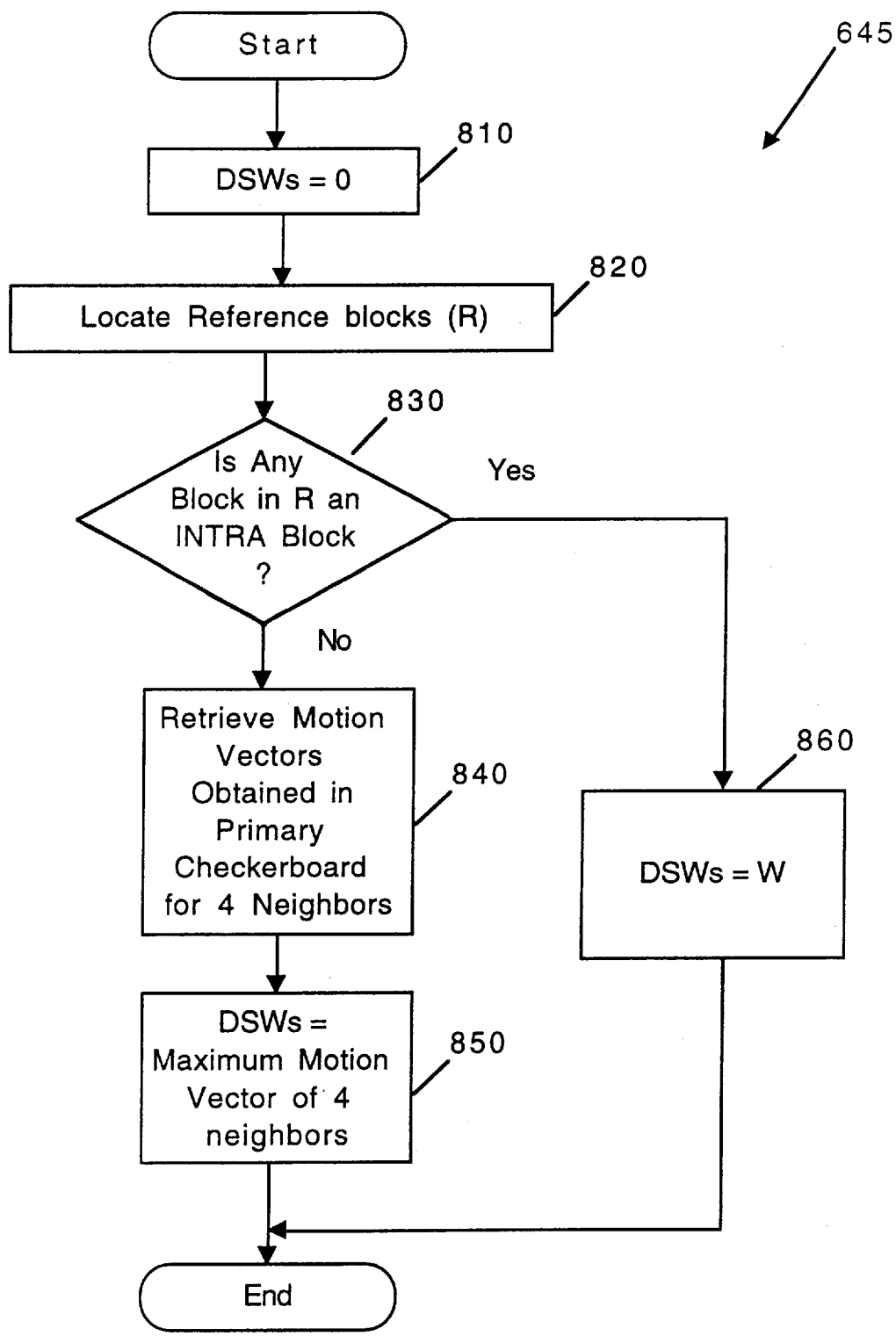
FIG. 8 is a flowchart further illustrating the step of FIGS. 6a and 6b of computing a spatial dynamic search window.

FIG. 8 is a flowchart illustrating the details of step 645 for computing the spatial dynamic search window for a selected block in the S-checkerboard of a current frame, such as block B$_S$ of frame 1110 (FIG. 11). Step 645 begins in step 810 by S-checkerboard processor 520 setting DSWs equal to zero. Processor 520 in step 820 locates the reference R blocks, namely, the four neighbors of the current block B$_S$, illustrated as blocks 10–13 in frame 1110. Processor 520 in step 830 determines if any of the reference blocks is an INTRA block. If so, then processor 520 in step 860 defines DSWs to be equal to the conventional search window W. Otherwise, processor 520 in step 840 retrieves the motion vectors which were already computed for the four neighboring blocks by processor 510. Processor 520 in step 850 sets each side of the spatial dynamic search window equal to two times the maximum motion vector, with the location of the center of the selected block equal to the center of the window.

Figure 12:
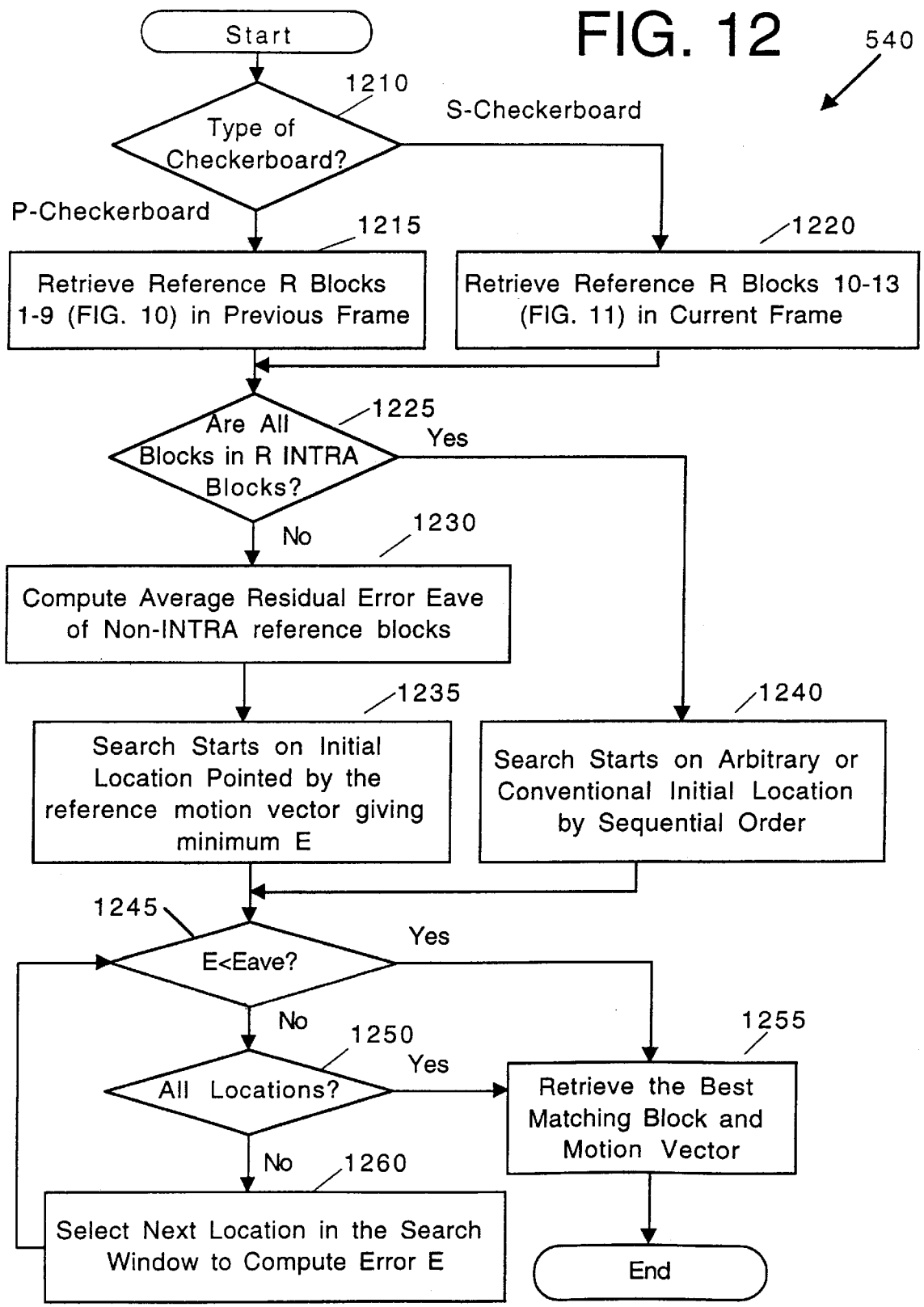
FIG. 12 is a flowchart illustrating the step of FIGS. 6a and 6b of computing the initial-conditioned search by the block matching engine.

FIG. 12 is a flowchart illustrating the details of operation of initial-conditioned search module 540 which is used by P-checkerboard processor 510 in step 630 and by S-checkerboard processor 520 in step 650. Module 540 begins in step 1210 by block matching engine 530 checking for the checkerboard type. If the current block is from a P-checkerboard, module 540 in step 1215 retrieves reference R blocks (blocks 1–9 of FIG. 10) from the previous frame. If the current block is from an S-checkerboard, module 540 in step 1220 retrieves reference blocks 10–13 of FIG. 11 from the current frame. Module 540 in step 1225 checks the retrieved reference blocks to determine if they are all INTRA blocks. If they are not, then module 540 in step 1230 computes the average residual error E$_{ave}$ of all non-INTRA reference blocks, and in step 1235 sets the initial search location pointed to by the reference motion vector giving the minimum E. Otherwise, module 540 in step 1240 sets the initial search location conventionally, such as by sequential order.

Block matching started by engine 530 in step 1235 or 1240 continues in step 1245 to determine if the current residual error E is less than E$_{ave}$. If so, module 540 in step 1255 retrieves the best matching block as the one centered at the current search location, and the motion vector pointing from the current search location to the center of the current block, and method 540 ends. If in step 1245, error E is greater than or equal to E$_{ave}$, module 540 determines whether all the locations in the search window have been searched. If so, module 540 returns to step 1255. If not, module 540 in step 1260 selects the next location in the search window to compute the error E. Module 540 then returns to step 1245.

Figure 13:
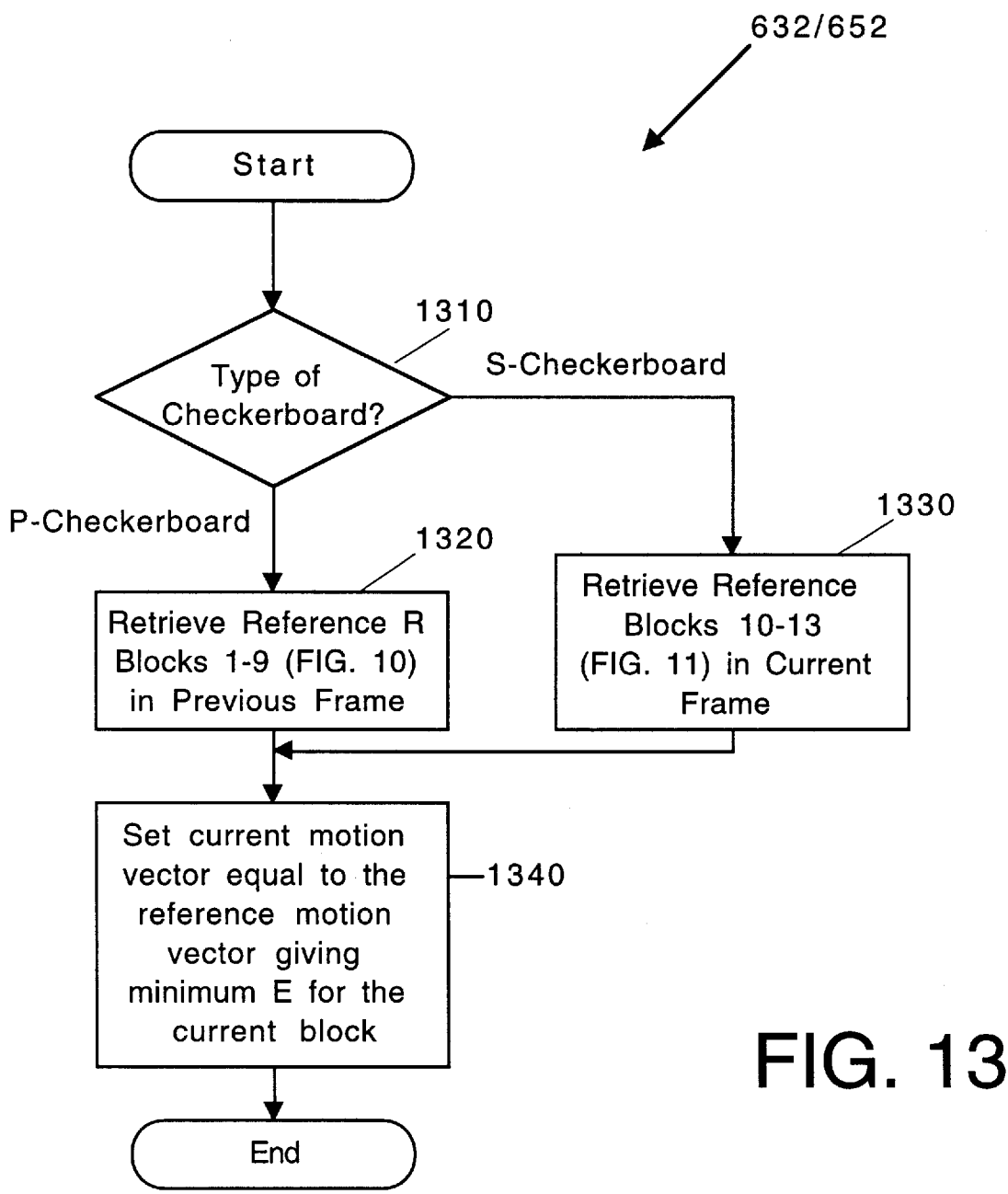
FIG. 13 is a flowchart illustrating the step of FIGS. 6a and 6b of interpolating the current motion vector.

FIG. 13 is a flowchart illustrating details of motion vector interpolation step 632 and step 652 of FIGS. 6a and 6b. Step 632 or step 652 begins by P-checkerboard processor 510 or S-checkerboard processor 520 in step 1310 by determining the checkerboard type. If the current block is from a P-checkerboard, processor 510 in step 1320 retrieves reference R blocks of FIG. 10 from the previous frame. If the current block is from an S-checkerboard, processor 520 in step 1330 retrieves reference blocks 10–13 of FIG. 11 from the current frame. Processor 510 or processor 520 in step 1340 then interpolates the motion vector as the reference motion vector providing the minimum E for the current block.

The foregoing description of the preferred embodiments of the invention is by way of example only, and other variations of the above-described embodiments and methods are provided by the present invention. Although this invention is described as comparing a current frame with a previous frame, a current frame can be compared with future frames, or with both previous and future frames. It will be appreciated that this compression technique can be combined with prior art techniques to further optimize motion estimation. Components of this invention may be implemented using a programmed general purpose digital computer, using application specific integrated circuits, or using a network of interconnected conventional components and circuits. The embodiments described herein have been presented for purposes of illustration and are not intended to be exhaustive or limiting. Many variations and modifications are possible in light of the foregoing teaching. The system is limited only by the following claims

What is claimed is:

1. A method for estimating block motion from a previous frame to a current frame, wherein the motion vectors for the previous frame are known, comprising the steps of:
   (a) selecting a block from the current frame;
   (b) retrieving the known previous motion vector for a block in the previous frame; and
   (c) using the known previous motion vector to determine the current motion vector for the selected block.

2. The method of claim 1 wherein the step of using the previous motion vector includes generating a temporal dynamic search window in the previous frame in which to perform block matching.

3. The method of claim 1 wherein the step of using the known previous motion vector includes interpolating the current motion vector from the known previous motion vector.

4. The step of claim 1 wherein the step of selecting a current block includes dividing the current frame in a primary checkerboard pattern of blocks, and selecting a block from the pattern.

5. A system for estimating block motion from a previous frame to a current frame, wherein the motion vectors for the previous frame have already been determined, comprising:
   (a) means for selecting a block from the current frame;
   (b) means for retrieving the known previous motion vector for the previous frame; and
   (c) means for using the known previous motion vector to determine the current motion vector for the selected block.

6. A computer data storage medium storing a program for causing the computer to perform the steps of:
   (a) selecting a block from the current frame;
   (b) retrieving the known previous motion vector for the previous frame; and
   (c) using the known previous motion vector to determine the current motion vector for the selected block.

7. A method for estimating block motion from a previous frame to a current frame, comprising the steps of:
   (a) acquiring motion vectors for blocks in the previous frame;
   (b) selecting a first current block from the current frame;
   (c) locating at least one reference block in the previous frame;
   (d) generating a temporal search window in the previous frame based on the motion vector for the reference block;
   (e) locating in the temporal search window a first previous block which best matches the first current block; and
   (f) determining a first current motion vector from the first previous block to the first current block.

8. The method of claim 7, further comprising the steps of:
   (g) selecting a second current block;
   (h) generating a spatial search window in the previous frame based on the first current motion vector;
   (i) locating in the spatial search window a second previous block which best matches the second current block; and
   (j) determining a second current motion vector from the second previous block to the second current block.

9. The method of claim 7 wherein the first current block is selected from the blocks of a primary checkerboard pattern of the current frame.

10. The method of claim 7 further comprising, after step (e) and before step (f), the step of repeating steps (b) through (f) inclusive for each of the blocks in the primary checkerboard pattern.

11. The method of claim 8 wherein the second current block is selected from the blocks of a secondary checkerboard pattern of the current frame, which is a complement of the primary checkerboard pattern.

12. The method of claim 7 wherein the at least one reference block includes the previous block which is at the same location as the first selected block, referred to as the coordinate previous block.

13. The method of claim 12 wherein the at least one reference block further includes the eight blocks surrounding the coordinate previous block.

14. The method of claim 7 wherein a side of the temporal search window has a length equal to two times an orthogonal portion of the motion vector.

15. The method of claim 7, further comprising after step (d) and before step (e), the step of using an initial condition search to determine the best location in the search window to start block matching.

16. The method of claim 15, wherein the step (e) determines the best matching block by determining if the error E for the previous block is less than a predetermined limit.

17. The method of claim 8 further comprising, after step (f) and before step (g), the step of locating at least one neighboring current block adjacent the second selected block, the first current motion vector of which has been determined.

18. The method of claim 8 wherein a side of the spatial search window has a length equal to two times an orthogonal portion of the first current motion vector.

19. A system for estimating block motion from an previous frame to a current frame, comprising:
   means for acquiring motion vectors for blocks in the previous frame, for selecting a first current block from the current frame, for locating at least one reference block in the previous frame, and for generating a temporal search window based on the motion vector for the reference block;

means for locating in the temporal search window a first previous block which best matches the first current block, and for determining a first current motion vector from the first previous block to the first current block;

means for selecting a second current block, for generating a spatial search window based on the first current motion vector; and means for locating in the spatial search window a second previous block which best matches the second current block, and for determining a second current motion vector from the second previous block to the second current block.

20. A computer data storage medium storing a program for causing the computer to perform the steps of:

(a) acquiring motion vectors for blocks in a previous frame;

(b) selecting a first current block from a current frame;

(c) locating at least one reference block in the previous frame;

(d) generating a temporal search window based on the motion vector for the reference block;

(e) locating in the temporal search window a first previous block which best matches the first current block;

(f) determining a first current motion vector from the first previous block to the first current block;

(g) selecting a second current block;

(h) generating a spatial search window based on the first current motion vector;

(i) locating in the spatial search window a second previous block which best matches the second current block; and (j) determining a second current motion vector from the second previous block to the second current block.

21. A system for estimating block motion from an previous frame to a current frame, comprising:

a first processor for acquiring motion vectors for a previous block, for using the motion vectors to generate a temporal dynamic search window for a first current block;

a block matching engine for locating a first previous block in the temporal search window that best matches the first current block, and for generating a first current motion vector from the first previous block to the first current block; and a second processor for using the first current motion vector to generate a spatial dynamic search window for a second current block;

the block matching engine being for locating a second previous block in the spatial search window that best matches the second current block, and for determining a second current motion vector from the second previous block to the second current block.

22. The system of claim 21 wherein the first processor and the block matching engine repeat operations until first current motion vectors have been determined for each of the blocks in the primary checkerboard pattern.

23. The system of claim 21 wherein the first processor selects the first current block from the blocks of a primary checkerboard pattern of the current frame.

24. The system of claim 23 wherein the second processor selects the second current block from the blocks of a secondary checkerboard pattern of the current frame, which is a complement of the primary checkerboard pattern.

25. The system of claim 21 wherein the first processor selects at least one reference block from the previous frame to determine the length of each side of the temporal dynamic search window.

26. The system of claim 25 wherein the at least one reference block includes the previous block which is at the same location as the first selected block, referred to as the coordinate previous block.

27. The system of claim 26 wherein the at least one reference block further includes the eight blocks surrounding the coordinate previous block.

28. The system of claim 27 wherein the first processor defines the length of a side of the temporal search window equal to two times an orthogonal portion of the motion vector.

29. The system of claim 21, wherein the block matching engine includes an initial condition search module for determining the best location in the dynamic search window to start block matching.

30. The system of claim 29, wherein the initial condition search module determines if the error E for a previous block is less than a predetermined limit.

31. The system of claim 21 wherein the length of a side of the spatial search window is equal to two times an orthogonal portion of the first current motion vector.

* * * * *